(12) United States Patent
Menzel et al.

(10) Patent No.: US 8,920,544 B2
(45) Date of Patent: Dec. 30, 2014

(54) REMOVAL OF CARBON DIOXIDE FROM GASES BY AQUEOUS AMINE SOLUTIONS CONTAINING A STERICALLY HINDERED AMINE

(75) Inventors: Johannes Menzel, Waltrop (DE); Olaf Von Morstein, Essen (DE)

(73) Assignee: ThyssenKrupp Uhde GmbH, Dortmund (DE)

(*) Notice: Subject to any disclaimer, the term of this patent is extended or adjusted under 35 U.S.C. 154(b) by 0 days.

(21) Appl. No.: 13/519,498

(22) PCT Filed: Dec. 21, 2010

(86) PCT No.: PCT/EP2010/007839
§ 371 (c)(1),
(2), (4) Date: Jun. 27, 2012

(87) PCT Pub. No.: WO2011/082809
PCT Pub. Date: Jul. 14, 2011

(65) Prior Publication Data
US 2012/0279393 A1 Nov. 8, 2012

(30) Foreign Application Priority Data
Jan. 5, 2010 (DE) .......... 10 2010 004 070

(51) Int. Cl.
*B01D 53/14* (2006.01)
(52) U.S. Cl.
CPC ........ *B01D 53/1475* (2013.01); *B01D 53/1493* (2013.01); *B01D 2257/504* (2013.01); *Y02C 10/06* (2013.01); *Y02C 10/04* (2013.01)
USPC .............. 95/159; 95/160; 95/165; 95/167; 95/171; 95/172; 95/173; 95/183; 95/236; 423/228

(58) Field of Classification Search
CPC ........... B01D 53/1475; B01D 53/1493; B01D 2257/504; Y02C 10/04; Y02C 10/06
USPC .......... 95/160, 161, 163, 165, 166, 173, 174, 95/178, 183, 236; 423/228, 229; 252/60
See application file for complete search history.

(56) References Cited

U.S. PATENT DOCUMENTS

| 4,217,236 | A | | 8/1980 | Sartori et al. | |
|---|---|---|---|---|---|
| 4,351,812 | A | * | 9/1982 | Correll et al. | 423/242.6 |
| 4,405,577 | A | | 9/1983 | Sartori et al. | |
| 5,700,437 | A | | 12/1997 | Fujii et al. | |
| 6,036,931 | A | | 3/2000 | Yoshida et al. | |
| 6,165,433 | A | * | 12/2000 | Chakravarti et al. | 423/229 |
| 6,500,397 | B1 | | 12/2002 | Yoshida et al. | |
| 2007/0286783 | A1 | | 12/2007 | Carrette et al. | |
| 2008/0125314 | A1 | | 5/2008 | Shim et al. | |
| 2009/0199709 | A1 | | 8/2009 | Rojey et al. | |
| 2009/0199713 | A1 | * | 8/2009 | Asprion et al. | 95/236 |

FOREIGN PATENT DOCUMENTS

WO 2008145658 12/2008

OTHER PUBLICATIONS

Choi et al., "Fragmentations and Proton Transfer Reactions of Product Ions Formed from Mono-, Di-, and Triethanolamines," 2004, Bull. Korean Chem. Soc., vol. 25, No. 10, 1538-1544.*
International Search Report for PCT/EP2010/007839, English translation attached to original, Both completed by the European Patent Office on Apr. 11, 2011, All together 4 Pages.

* cited by examiner

*Primary Examiner* — Duane Smith
*Assistant Examiner* — Cabrena Holecek
(74) *Attorney, Agent, or Firm* — Brooks Kushman P.C.

(57) ABSTRACT

A method for removing acid gases from a fluid flow using an absorbent including an aqueous solution with at least two different amines. An amine in a proportion of greater than 50 wt. % of the total amine amount in the aqueous solution is the first amine component in the aqueous solution, and a sterically hindered amine in a proportion of less than 50 wt. % is the second amine component in the aqueous solution. The fluid flow is brought into contact with the absorbent at a partial pressure of <200 mbar.

17 Claims, No Drawings

REMOVAL OF CARBON DIOXIDE FROM GASES BY AQUEOUS AMINE SOLUTIONS CONTAINING A STERICALLY HINDERED AMINE

CROSS-REFERENCE TO RELATED APPLICATION

This application is the U.S. national phase of PCT Appln. PCT/EP2010/007839 No. filed on Dec. 21, 2010 which claims priority to DE Patent Application No. 10 2010 004 070.3 filed on Jan. 5, 2010, the disclosures of which are incorporated in their entirety by reference herein.

The invention relates to the use of an absorbent for the purpose of removing $CO_2$ from technical gases.

The removal of $CO_2$ from technical gases is of special importance with regard to the reduction of $CO_2$ emissions, with $CO_2$ being considered the main cause of the greenhouse effect.

Industry often uses aqueous solutions of organic bases such as alkanolamines, for example, as absorbents for the removal of sour gas components.

The absorbent is regenerated by supplying heat, depressurising or stripping by means of suitable auxiliary agents. Once the absorbent has been regenerated, it can be reused as a regenerated solvent in the absorption of sour gas components.

Flue gases from the combustion of fossil fuels are obtained at approximately atmospheric pressure. As the $CO_2$ content in the flue gases is typically around 3 to 13% by vol., the $CO_2$ partial pressure ranges correspondingly between only 0.03 and 0.13 bar. To achieve an adequate removal of $CO_2$ from the flue gases at such low $CO_2$ partial pressures, a suitable absorbent is to have a very high $CO_2$ absorption capacity. In particular, highest possible absorption capacity should also be ensured already at low $CO_2$ partial pressures.

The absorption capacity of the absorbent largely determines the required circulation flow rate of the absorbent and thus the size and cost of the necessary equipment. As the energy required for heating and cooling the absorbent is proportional to the circulation flow rate, the regeneration energy required for regenerating the solvent will decrease to a significant degree if the circulation flow rate of the absorbent can successfully be reduced.

Beside the mere absorption capacity it is crucial for the so-called cyclic absorption capacity of an amine that in the thermal regeneration of the amine an as little amount as possible of the carbon dioxide absorbed during the absorption remains in the solvent. Primary and secondary amines mainly form carbamates with the absorbed $CO_2$, a considerable portion of these carbamates not being regenerated even under typical regeneration conditions (120° C., 2 bar) and remaining in the solution as carbamate which involves that only a certain part of the absorption capacity of these amine solutions can be used for the removal of $CO_2$.

For this reason, there is a significant demand for an absorbent which, on the one hand, has the advantages of the primary and secondary amines, i.e. their high absorption capacity, and which, on the other hand, leaves as little chemically bound $CO_2$ in the solution under typical regeneration conditions. To meet such demand, i.e. to make such an absorbent available, and to provide such a method for the removal of $CO_2$ from technical gases, these are the aims of the present invention.

The aim is achieved by the use of an absorbent consisting of an aqueous solution with at least two different amines, with any arbitrary amine with a share of more than 50 wt. % in the total amine content of the aqueous solution constituting the first amine component in the aqueous solution, and with a sterically hindered amine with a share of less than 50 wt. % in the total amine content constituting the second amine component in the aqueous solution, the fluid stream being brought into contact with the absorbent at a partial pressure of <200 mbar.

The share of the arbitrary amine in the total amine content of the aqueous solution ranges preferably between 60 wt. % and 90 wt. % and particularly preferably between 70 wt. % and 85 wt. %. Correspondingly, the share of the sterically hindered amine in the total amine content of the aqueous solution ranges preferably between 10 wt. % and 40 wt. % and is preferentially between 15 and 30 wt. %.

In a preferred embodiment the sterically hindered amine is selected from a group comprising (i) amines with a primary amino group which is bound to a tertiary carbon atom,
(ii) amines with a secondary amino group which is bound to a secondary or tertiary carbon atom, and
(iii) amines in which a tertiary or quaternary carbon atom is placed in β position to the amino group.

Here, the particularly preferred sterically hindered amine is 2-amino-2-methyl-1-propanol (AMP). A multitude of further sterically hindered amines that could be used for this purpose are disclosed in documents WO 2008/145658 A1, US 2009/0199713 A1, U.S. Pat. No. 4,217,236, U.S. Pat. No. 5,700,437, U.S. Pat. No. 6,036,931 and U.S. Pat. No. 6,500,397 B1.

The arbitrary amine is preferably piperazine or a piperazine derivative.

In a further embodiment of the invention the arbitrary amine constitutes an amine with more than one amino group in the molecule, with the amino group existing in primary and in secondary structure as well as in mixed primary and secondary structure.

In a further advantageous embodiment the arbitrary amine is a diamine of the formula $H_2N$—R2-$NH_2$, where R2 represents a $C_2$ to $C_6$ alkyl group.

Optionally the arbitrary amine is selected from a group comprising ethylene diamine, 1,4 diaminobutane, 1,3 diaminopropane, 1,2 diaminopropane, 2,2 dimethyl-1,3 diaminopropane, hexamethylene diamine, 3-methyl aminopropylamine, 3-(dimethyl amino)propylamine, 3-(diethyl amino) propylamine, 4-dimethyl aminobutylamine and 5-dimethyl aminopentylamine, 1,1,N,N-tetramethyl ethane diamine, 2,2,N,N-tetramethyl-1,3-propane diamine, N,N'-dimethyl-1,3-propane diamine and N,N'bis(2-hydroxyethyl)ethylene diamine.

In a further preferred embodiment the arbitrary amine is a diamine of the formula R1-HN—R2-$NH_2$, where R1 represents a $C_1$-$C_6$ alkyl and R2 a $C_2$ to $C_6$ alkyl group.

Advantageously the arbitrary amine also is a polyalkylene polyamine selected from a group comprising diethylene triamine, triethylene tetramine, tetraethylene pentamine, tris(3-amino propyl)amine, tris(2-amino ethyl)amine, bis(3-dimethylamino propyl)amine, methyl-bis(2-methyl amino ethyl) amine.

The arbitrary amine is optionally a primary or a secondary amine such as, for example, 2-aminoethanol (monoethanolamine, MEA), N,N-bis(2-hydroxyethyl)amine (diethanol amine, DEA), N,N-bis(2-hydroxypropyl)amine (diisopropanol amine, DIPA), 2-(methylamino)ethanol, 2-(ethylamino)ethanol, 2-(n-bnutylamino)ethanol, 2-amino-1-butanol (2-AB), 3-amino-1-propanol and 5-amino-1-pentanol.

In a preferred embodiment of the invention the arbitrary amine is a tertiary amine of the general formula $N(R1)_{2-n}(R2)_{1+n}$, where R1 represents an alkyl group and R2 a hydroxyalkyl group, or a tertiary amine of the general formula $(R1)_{2-n}(R2)_nN—X—N(R1)_{2-m}(R2)_m$, where R1 represents an alkyl group, R2 a hydroxyalkyl group, X an alkylene group which is interrupted once or several times by oxygen and n and m representing an integer from 0 to 2, or two remainders R1 and R2 bound to different nitrogen atoms together representing an alkylene group. Here, the arbitrary amine is selected from a group comprising bis-dimethylaminoethyl ether, tris(2-hydroxyethyl)amine, tris(2-hydroxypropyl)amine, tributanolamine, bis(2-hydroxyethyl)-methylamine, 2-diethylaminoethanol, 2-dimethylaminoethanol, 3-dimethylamino-1-propanol, 3-diethylamino-1-propanol, 2-diisopropylaminoethanol, N,N-bis(2-hydroxypropyl)methylamin (methyldiisopropanolamin, MDI PA), N,N,N',N'-tetramethylethylendiamine, N,N-diethyl-N',N'-dimethylethylendiamine, N,N,N',N'-tetraethylethylendiamin, N,N',N'-tetramethylpropandiamine, N,N,N',N'-tetraethylpropandiamine, N,N-dimethyl-N',N'-diethylethylendiamine, 2-(2-dimethylaminoethoxy)-N,N-dimethylethanamine; 1,4-diazabicyclo[2.2.2]octane (DABCO); N,N,N'-trimethylaminoethylethanolamine, N,N'-dimethylpiperazine and N,N'-bis(hydroxyethyl)piperazine. Bis-dimethylaminoethyl ether is used with particular preference.

The laden absorbent is advantageously regenerated by heating, depressurising, stripping with stripping vapours produced by internal evaporation of the solvent, stripping with an inert fluid or by a combination of two or all of these measures.

The present invention is described below in more detail with the help of measuring results.

Our measurements have disclosed in a surprising manner that a mixture of 50 wt. % $H_2O$, 37 wt. % piperazine and 13 wt. % AMP, for example, gives a significantly lower residual $CO_2$ load under regeneration conditions (120° C.) than a mixture of 50 wt. % $H_2O$ and 50 wt. % piperazine. In this example, piperazine constitutes a secondary diamine and AMP a sterically hindered amine.

The residual $CO_2$ load under regeneration conditions was determined by equilibrium measurements at a temperature of 120° C. by the so-called synthetic method and was compared with values from literature measured for the pure aqueous piperazine solution.

The result was that an amine solution with a total amine content of 50 wt. %, which also contains a minor portion of a sterically hindered amine (AMP of 28 wt. % referred to the total amine content in the solution) beside the major portion of piperazine, under equilibrium conditions which are comparable to the conditions at the bottom of a desorber during the regeneration of the amine solution, i.e. at a temperature of 120° C. and a $CO_2$ partial pressure of 0.09 bar, has a significantly lower residual $CO_2$ content than an aqueous solution of a content of 50 wt. % piperazine (cf. Table 1).

TABLE 1

| Absorbent (portion of amines in the total amine content) | Residual $CO_2$ content in equilibrium at 120° C. and 0.09 bar $CO_2$ partial pressure relative to pure piperazine, in % |
|---|---|
| Piperazine (100 wt. %) | 100 |
| Piperazine (72 wt. %), AMP (28 wt. %), | 44 |

In former experiments it was found that the absolute $CO_2$ absorbability of an amine solution which contains only minor portions of a sterically hindered amine (28% referred to the total amine content, 72% piperazine) is only slightly lower than the absolute $CO_2$ absorbability of an amine solution which only contains piperazine.

Thus, the $CO_2$ absorption at a $CO_2$ partial pressure of 0.03 bar (available and comparable measured values for a $CO_2$ partial pressure of <100 mbar) and at a temperature of 40° C. was determined for an aqueous piperazine solution and an aqueous solution of piperazine and AMP. The first solution of piperazine and AMP contained 72% piperazine and 28% AMP and the second 28% piperazine and 72% AMP. The percentage figures refer to the share of amines in the total amine content (cf. Table 2).

TABLE 2

| Absorbent (portion of amines in the total amine content) | Absorption capacity in % |
|---|---|
| Piperazine (100 wt. %) | 100 |
| Piperazine (72 wt. %), AMP (28 wt. %) | 92 |
| Piperazine (28 wt. %), AMP (72 wt. %) | 53 |

It was found that a mixture with a 28% content of a sterically hindered amine can absorb only slightly less $CO_2$ (8%) than a mixture which merely consists of an aqueous solution of a secondary diamine. However, if the content of the sterically hindered amine is further increased, the overall capacity decreases significantly (only half the capacity as compared to the pure aqueous amine solution) so that a higher content of sterically hindered amines is rather of disadvantageous effect. However, if one considers the significant improvement of the residual $CO_2$ content in the solution under regeneration conditions it becomes evident that the cyclic $CO_2$ absorption capacity in the case of a solution which contains a certain portion of sterically hindered amines is significantly higher than in the case of a reference solution which does not contain the sterically hindered amine in portions of less than 50% referred to the total amine content.

To clarify if the observed behaviour of the influence of a sterically hindered amine on the improved regenerability applies to primary amines just as to secondary amines, 1,3 diaminopropane in aqueous solution was compared by way of example to a mixture of 1,3 diaminopropane and AMP in aqueous solution.

TABLE 3

| Absorbent (portion of amines in the total amine content) | Residual $CO_2$ content in equilibrium at 120° C. and 0.09 bar $CO_2$ partial pressure relative to pure piperazine, in % |
|---|---|
| 1,3 diaminopropane (100 wt. %) | 100 |
| 1,3 diaminopropane (72 wt. %), AMP (28 wt. %) | 79 |

This system proved as well that, if a sterically hindered amine is added to a primary diamine in aqueous solution, the residual $CO_2$ load decreases under typical regeneration conditions, even though the effect is not as large as in the case of the secondary diamine, i.e. piperazine.

The invention claimed is:
1. A method for absorbing sour gases from a fluid stream comprising:

providing an absorbent aqueous solution with an amine component, the amine component consisting essentially of, a first amine component selected from the group consisting of piperazine, 1,3-diaminopropane, and mixtures thereof, the first amine component being 70-85 wt. % of the total amine content of the aqueous solution, and a second amine component consisting of one or more sterically hindered amines in an amount of from 15-30 wt. % of the total amine content of the aqueous solution, and bringing the fluid stream into contact with the absorbent at a partial pressure of the sour gases of <200 mbar in the fluid stream, absorbing the sour gases and producing an absorbent laden with sour gases.

2. The method of claim 1, wherein the sterically hindered amine is selected from the group consisting of:
(i) amines with a primary amino group which is bound to a tertiary carbon atom,
(ii) amines with a secondary amino group which is bound to a secondary or tertiary carbon atom,
(iii) amines in which a tertiary or quaternary carbon atom is in a position β to the amino group,
and mixtures thereof.

3. The method of claim 1, wherein the sterically hindered amine is 2-amino-2-methyl-1-propanol (AMP).

4. The method of claim 1, further comprising regenerating the laden absorbent by:
heating,
depressurizing,
stripping with the aid of stripping vapours produced by internal evaporation of the aqueous solution,
stripping with the aid of an inert fluid, or a combination of at least two of these measures.

5. The method of claim 2, further comprising regenerating the laden absorbent by:
heating,
depressurizing,
stripping with the aid of stripping vapours produced by internal evaporation of the aqueous solution,
stripping with the aid of an inert fluid, or
a combination of at least two of these measures.

6. The method of claim 3, further comprising regenerating the laden absorbent by:
heating,
depressurizing,
stripping with the aid of stripping vapours produced by internal evaporation of the aqueous solution,
stripping with the aid of an inert fluid, or
a combination of at least two of these measures.

7. A method for removing sour gases from a fluid stream comprising:
a) providing an absorbent in an aqueous solution with an amine component, the amine component consisting of
ai) a first amine component selected from the group consisting of piperazine, 1,3 diaminopropane, and mixtures thereof, the first amine component being 70-85 wt. % of the total amine content of the aqueous solution, and
aii) a second amine component consisting of one or more sterically hindered amines in an amount of from 15-30 wt. % of the total amine content in the aqueous solution,
b) bringing the fluid stream into contact with the absorbent at a partial pressure of the sour gases of <200 mbar in the fluid stream, absorbing the sour gases and producing an absorbent laden with sour gases,
c) heating the absorbent laden with sour gases to remove sour gases from the absorbent, and cooling
d) recycling the cooled absorbent to step a).

8. The method of claim 1, wherein the fluid stream is flue gas.

9. The method of claim 1, wherein the first amine component consists of 1,3-diaminopropane.

10. The method of claim 7, wherein the first amine component consists of 1,3-diaminopropane.

11. The method of claim 8, wherein the first amine component consists of 1,3-diaminopropane.

12. The method of claim 1, wherein the fluid stream contacts the absorbent at a temperature of about 40° C.

13. The method of claim 4, wherein the sour gases are liberated from the absorbent liquid during regenerating.

14. The method of claim 1, wherein the fluid stream contacts the absorbent at a temperature of 40° C.

15. The method of claim 1, wherein the first amine compound is present in an amount of 72-76 wt. % of the total amine compound and the second amine compound is present in an amount of 26-28 wt. % of the total amine compound.

16. The method of claim 1, wherein the first amine compound is present in an amount of 72-85 wt. %.

17. The method of claim 1, wherein the first amine compound is present in an amount of 76-85 wt. %.

* * * * *

UNITED STATES PATENT AND TRADEMARK OFFICE
CERTIFICATE OF CORRECTION

| | | |
|---|---|---|
| PATENT NO. | : 8,920,544 B2 | Page 1 of 1 |
| APPLICATION NO. | : 13/519498 | |
| DATED | : December 30, 2014 | |
| INVENTOR(S) | : Johannes Menzel et al. | |

It is certified that error appears in the above-identified patent and that said Letters Patent is hereby corrected as shown below:

In the Claims

Column 6, Line 21, Claim 7:

After "from the absorbent, and cooling"
Insert -- the absorbent, and --.

Signed and Sealed this
Nineteenth Day of May, 2015

Michelle K. Lee
*Director of the United States Patent and Trademark Office*